United States Patent
Prchal

(10) Patent No.: US 8,914,863 B2
(45) Date of Patent: Dec. 16, 2014

(54) ENHANCING THE SECURITY OF NEAR-FIELD COMMUNICATION

(71) Applicant: Navteq B.V., Veldhoven (NL)

(72) Inventor: Ken A. Prchal, Seattle, WA (US)

(73) Assignee: HERE Global B.V., Veldhoven (NL)

(*) Notice: Subject to any disclaimer, the term of this patent is extended or adjusted under 35 U.S.C. 154(b) by 0 days.

(21) Appl. No.: 13/853,470

(22) Filed: Mar. 29, 2013

(65) Prior Publication Data

US 2014/0298434 A1 Oct. 2, 2014

(51) Int. Cl.
*G06Q 40/00* (2012.01)
*H04B 5/00* (2006.01)
*H04W 12/06* (2009.01)

(52) U.S. Cl.
CPC ............ *H04W 12/06* (2013.01); *H04B 5/0031* (2013.01)
USPC ................................................ 726/7; 705/42

(58) Field of Classification Search
CPC ......................... G06Q 20/108; G06Q 20/3278
USPC ................................................ 726/7; 705/42
See application file for complete search history.

(56) References Cited

U.S. PATENT DOCUMENTS

| | | | |
|---|---|---|---|
| 5,260,551 A | 11/1993 | Wiik et al. | |
| 5,451,934 A | 9/1995 | Dawson et al. | |
| 6,026,166 A * | 2/2000 | LeBourgeois | 713/156 |
| 6,175,922 B1 | 1/2001 | Wang | |
| 6,421,453 B1 | 7/2002 | Kanevsky et al. | |
| 6,624,742 B1 | 9/2003 | Romano et al. | |
| 7,142,842 B2 | 11/2006 | Rooke et al. | |
| 7,176,886 B2 | 2/2007 | Marvit et al. | |
| 7,290,145 B2 * | 10/2007 | Falkenthros | 713/182 |
| 7,412,422 B2 * | 8/2008 | Shiloh | 705/74 |
| 7,467,211 B1 * | 12/2008 | Herman et al. | 709/229 |
| 7,536,721 B2 | 5/2009 | Stevens et al. | |
| 7,685,034 B1 * | 3/2010 | Mori et al. | 705/31 |

(Continued)

FOREIGN PATENT DOCUMENTS

| | | |
|---|---|---|
| EP | 0416792 | 3/1991 |
| EP | 0810559 | 12/1997 |

(Continued)

OTHER PUBLICATIONS

Ann Cavoukian, Ph.D., Mobile Near Field Communications (NFC) Tap 'n. Go Keep it Secure & Private, Nov. 2011, Information and Privacy Commissioner, Ontario, Canada.

(Continued)

*Primary Examiner* — Haresh N Patel
(74) *Attorney, Agent, or Firm* — Lempia Summerfield Katz LLC

(57) ABSTRACT

Security of near-field communication (NFC) may be enhanced. A user authentication may be provided via a mobile device enabled as a first NFC device. The user authentication may be specified by an end user of the mobile device for permitting NFC with a second NFC device. The user authentication may be related to an environmental object or a perspective of the mobile device specified by the end user. It may be determined whether the mobile device and the second NFC device are in proximity to one another. When the mobile device and the second NFC device are in proximity to one another and a detected action performed by a user with the mobile device is substantially similar to the provided user authentication, NFC between the mobile device and the second NFC device may be permitted.

20 Claims, 5 Drawing Sheets

(56) References Cited

U.S. PATENT DOCUMENTS

| | | | |
|---|---|---|---|
| 7,873,989 B2 | 1/2011 | Karkas et al. | |
| 8,045,961 B2* | 10/2011 | Ayed et al. | 455/411 |
| 8,112,066 B2* | 2/2012 | Ben Ayed | 455/411 |
| 8,112,405 B2* | 2/2012 | Shiloh | 707/705 |
| 8,145,352 B2 | 3/2012 | Woodard et al. | |
| 8,190,129 B2* | 5/2012 | Ben Ayed | 455/411 |
| 8,230,088 B2* | 7/2012 | Herman et al. | 709/229 |
| 8,260,262 B2* | 9/2012 | Ben Ayed | 455/411 |
| 8,336,766 B1* | 12/2012 | Miller et al. | 235/379 |
| 8,376,227 B2 | 2/2013 | Hammad et al. | |
| 8,380,177 B2* | 2/2013 | Laracey | 455/414.1 |
| 8,467,770 B1* | 6/2013 | Ben Ayed | 455/411 |
| 8,479,978 B1* | 7/2013 | Miller et al. | 235/379 |
| 8,496,168 B1* | 7/2013 | Miller et al. | 235/379 |
| 8,498,618 B2* | 7/2013 | Ben Ayed | 455/411 |
| 8,579,192 B1* | 11/2013 | Miller et al. | 235/379 |
| 8,645,348 B2* | 2/2014 | Shiloh | 707/705 |
| 2001/0037316 A1* | 11/2001 | Shiloh | 705/74 |
| 2003/0105715 A1* | 6/2003 | Friedman et al. | 705/43 |
| 2007/0035411 A1 | 2/2007 | Jalkanen et al. | |
| 2007/0040810 A1* | 2/2007 | Dowe et al. | 345/173 |
| 2008/0170776 A1 | 7/2008 | Albertson et al. | |
| 2008/0230598 A1 | 9/2008 | Bodin | |
| 2008/0252415 A1 | 10/2008 | Larson et al. | |
| 2008/0273764 A1 | 11/2008 | Scholl | |
| 2009/0024636 A1* | 1/2009 | Shiloh | 707/10 |
| 2009/0070478 A1* | 3/2009 | Herman et al. | 709/231 |
| 2009/0183541 A1 | 7/2009 | Sadighi et al. | |
| 2010/0197352 A1 | 8/2010 | Runstedler et al. | |
| 2011/0061100 A1 | 3/2011 | Mattila et al. | |
| 2011/0070828 A1 | 3/2011 | Griffin et al. | |
| 2011/0070829 A1 | 3/2011 | Griffin et al. | |
| 2011/0169729 A1 | 7/2011 | Holleis et al. | |
| 2011/0215921 A1* | 9/2011 | Ben Ayed et al. | 340/539.11 |
| 2011/0251892 A1* | 10/2011 | Laracey | 705/14.51 |
| 2011/0282785 A1 | 11/2011 | Chin | |
| 2011/0293095 A1* | 12/2011 | Ben Ayed | 380/270 |
| 2011/0313922 A1* | 12/2011 | Ben Ayed | 705/42 |
| 2012/0019361 A1* | 1/2012 | Ben Ayed | 340/5.83 |
| 2012/0019379 A1* | 1/2012 | Ben Ayed | 340/539.1 |
| 2012/0101911 A1* | 4/2012 | Shiloh | 705/26.1 |
| 2012/0192252 A1 | 7/2012 | Kuo et al. | |
| 2012/0202423 A1 | 8/2012 | Tiedemann et al. | |
| 2012/0227092 A1 | 9/2012 | Smith | |
| 2012/0310618 A1* | 12/2012 | B'Far et al. | 703/13 |
| 2012/0310870 A1* | 12/2012 | Caves et al. | 706/14 |
| 2013/0151111 A1* | 6/2013 | Skelton | 701/99 |
| 2013/0191789 A1* | 7/2013 | Calman et al. | 715/863 |
| 2013/0238455 A1* | 9/2013 | Laracey | 705/21 |
| 2013/0246203 A1* | 9/2013 | Laracey | 705/21 |
| 2013/0247117 A1* | 9/2013 | Yamada et al. | 725/93 |
| 2013/0260794 A1* | 10/2013 | Prchal et al. | 455/456.3 |
| 2013/0298208 A1* | 11/2013 | Ayed | 726/6 |
| 2013/0310163 A1* | 11/2013 | Smith et al. | 463/26 |
| 2014/0009268 A1* | 1/2014 | Oshima et al. | 340/12.5 |
| 2014/0045586 A1* | 2/2014 | Allen et al. | 463/25 |
| 2014/0141864 A1* | 5/2014 | Ward et al. | 463/25 |

FOREIGN PATENT DOCUMENTS

| | | |
|---|---|---|
| EP | 0856624 | 8/1998 |
| EP | 2493232 | 8/2012 |
| EP | 2506201 | 10/2012 |
| GB | 2202354 | 9/1988 |
| GB | 2328843 | 3/1999 |
| GB | 2364202 | 1/2002 |
| WO | WO9314571 | 7/1993 |
| WO | WO9401963 | 1/1994 |
| WO | WO0231778 | 4/2002 |
| WO | WO2008092527 | 8/2008 |
| WO | WO2011057287 | 5/2011 |
| WO | WO2013027077 | 2/2013 |

OTHER PUBLICATIONS

Dennis Guse, Gesture-based User Authentication on Mobile Devices using Accelerometer and Gyroscope, May 31, 2011, Berlin Institte of Technology.

International Search Report and Written Opinion in PCT/EP2014/056259, mailed Jun. 25, 2014.

* cited by examiner

ENHANCING THE SECURITY OF NEAR-FIELD COMMUNICATION

BACKGROUND

The present embodiments relate to near-field communication (NFC).

NFC refers to radio communication between devices in the immediate vicinity of each other. NFC technology typically utilizes magnetic field induction to enable contactless short-range communications between electronic devices. Some mobile devices incorporate NFC technology to facilitate two-way contactless and short-range communications between the respective mobile device and another electronic device. NFC technology is increasingly accepted as a way to conduct commerce, provide sensitive identifying information, share other personal data, and grant or deny access to a secure location.

Although NFC technology provides users opportunities to easily perform a number of different actions with their electronic devices, NFC technology is associated with a number of security concerns. If, for example, the electronic device is lost or stolen, sensitive personal information (e.g., credit card numbers, social security number) and/or security information (e.g., access codes) may be accessed by an un-authorized user. The electronic device may, in some cases, be password protected, but this password may be cracked and/or compromised. Moreover, the actual exchange or transmission of data (e.g., digital currency, permissions) may be replicated or compromised. Because of these security concerns, users of electronic devices may be less willing to utilize, or may choose to completely avoid, NFC technology when conducting commerce, providing sensitive identifying information, sharing other personal data, or controlling access to secure locations.

SUMMARY

To address these and other objectives, the present embodiments relate to enhancing the security of near-field communication.

A method for enhancing security of near-field communication (NFC) may be provided. A user authentication may be provided via a mobile device enabled as a first NFC device. The user authentication may be specified by an end user of the mobile device for permitting NFC with a second NFC device. The user authentication may be related to an environmental object or a perspective of the mobile device specified by the end user. It may be determined whether the mobile device and the second NFC device are in proximity to one another. When it is determined that the mobile device and the second NFC device are in proximity to one another and a detected action performed by a user with the mobile device is substantially similar to the provided user authentication, NFC between the mobile device and the second NFC device may be permitted.

BRIEF DESCRIPTION OF THE DRAWINGS

Exemplary embodiments of the present invention are described herein with reference to the following drawings.

DETAILED DESCRIPTION OF THE PRESENTLY PREFERRED EMBODIMENTS

The present embodiments aim to provide methods, computer readable storage media with instructions, and systems for enhancing the security of near-field communication (NFC) between a mobile device and an NFC device. To enhance the security of NFC, a user authentication may be provided by an end user of the mobile device. The user authentication is related to one or more environmental objects or features external to the mobile device and the end user, an orientation of the mobile device, a change in the orientation of the mobile device, or combinations thereof, specified by the end user. For example, the user authentication may be an image of an environmental object or a series of images depicting one or more environmental objects. The user authentication is thus different than, and indeed more than, a text-based password or personal identification number. One or more actions performed by a user (e.g., the end user or a different user) with the mobile device may be determined. When the mobile device and the NFC device are in proximity to one another and one or more of the actions performed by the user with the mobile device satisfy (e.g., are substantially similar to) the user authentication, NFC communication between the mobile device and the NFC device may be permitted.

Since the user authentication is specified by the end user, the present embodiments may provide an extra layer of security to NFC between the mobile device and the NFC device. This may give the end user piece of mind regarding the security of sensitive information, security information, and personal photos, music, videos, or files that may be exchanged using NFC. As such, end users may be encouraged to use, or increase usage of, NFC to conduct commerce, provide sensitive information, share other personal data, or control access to secure locations.

Figure 1:
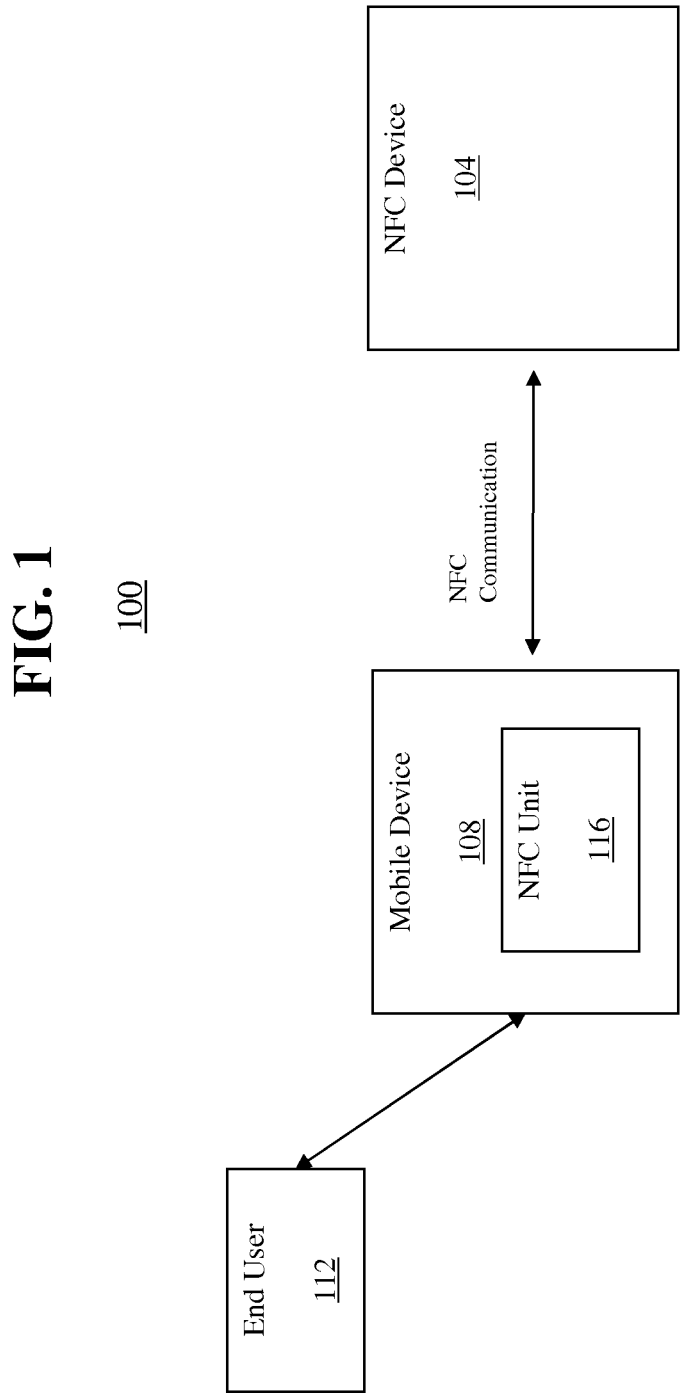
FIG. 1 depicts a block diagram of one embodiment of a system for enhancing security of near-field communication (NFC) between a mobile device and an NFC device.

FIG. 1 shows a block diagram of one embodiment of a system 100 for enhancing the security of near-field communication (NFC). The system 100 generally includes an NFC device 104 and a mobile device 108 associated with (e.g., owned or operated by) an end user 112. The mobile device 108 includes an NFC unit or device 116, such that the mobile device 108 is NFC-enabled or operable. In other embodiments, the system 100 may include additional, different, or fewer components. For example, additional NFC devices 104 and/or mobile devices 108 may be provided.

The NFC device 104 and the mobile device 108 may communicate with one another via the NFC communications protocol. The NFC device 104 and the mobile device 108 may utilize RFID, ISO standard 14443, Bluetooth, Infrared, or other communications technology. NFC communications typically operate at 13.56 MHZ, but other suitable versions of NFC may operate at different operating frequencies. Although not specifically illustrated herein, the NFC device 104 and/or the mobile device 108 may also be coupled to one or more wireless networks, wired networks, or combinations of a wired and wireless network, such as a cellular telephone network and/or 802.11x compliant network. The connected network may include a publicly accessible network, such as the Internet, a private network, or a combination thereof.

The NFC device 104 is an NFC tag, NFC transponder, NFC reader, or other device (e.g., another mobile device 108) that is NFC enabled and compatible. The NFC device 104 may be used to conduct commercial transactions (e.g., for mobile payment), control access (e.g., to a vehicle, to a residence, to a business, to an event, to public transportation, or some other location), exchange data (e.g., photos, videos, music, contacts, files, or other data), to set up wireless connections (e.g., Bluetooth, WiFi), for some other purpose, or combinations thereof. Depending upon what the NFC device 104 is used for, the NFC device 104 may be associated with a secure point of entry (e.g., a gate, a door, a turnstile, etc.), a merchant terminal (e.g., a cash register or automated vending), another end user 112, a networking device, or some other device or object. In turn, the NFC device 104 may be positioned or located on, adjacent, or near the secure point of entry, the merchant terminal, the networking device, or other device or object. In other embodiments, the NFC device 104 may be remotely located from the secure point of entry, the merchant terminal, the networking device, or other device or object. The NFC device 104 may or may not be movable between different locations.

Figure 2:
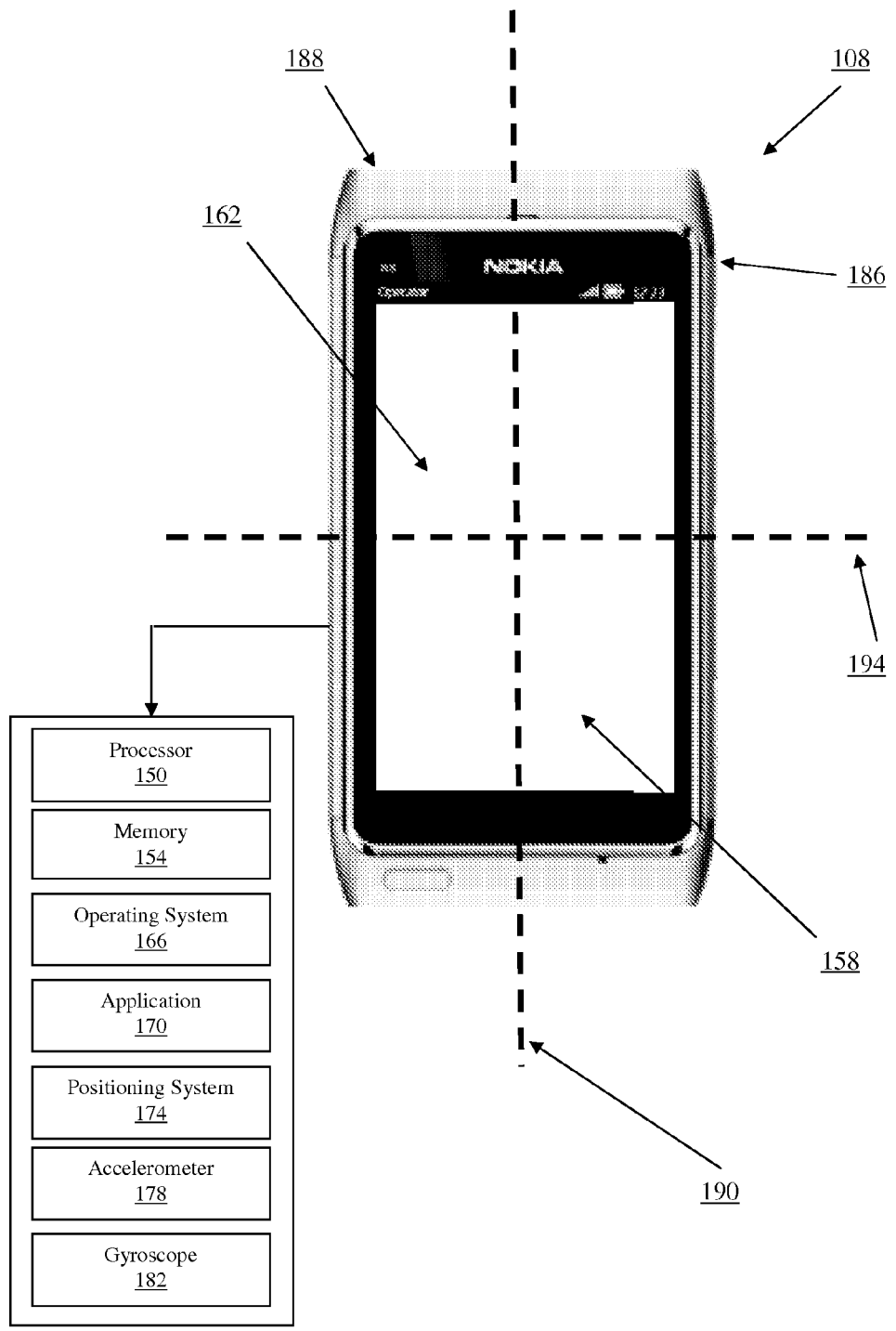
FIG. 2 depicts a more detailed view of an exemplary mobile device of the system of FIG. 1.

FIG. 2 shows one embodiment of the mobile device 108. In this embodiment, the mobile device 108 is a smart phone (e.g., manufactured by Nokia Corp.). In other embodiments, the mobile device 108 may be a mobile phone, a personal digital assistant ("PDA"), a tablet computer, a notebook computer, a personal navigation device ("PND"), a portable navigation device, a key fob, and/or any other known or later developed portable or mobile device, associated with the end user 112.

As shown in FIG. 2, the mobile device 108 includes a processor 150, a memory 154, an input device 158, a display 162, an operating system 166, and an application 170. In other embodiments, the mobile device 108 may include additional, fewer, or different components. For example, the client device 108 may include additional input devices 158 and/or applications 170.

The processor 150 may be a general processor, a digital signal processor, ASIC, field programmable gate array, graphics processing unit, analog circuit, digital circuit, combinations thereof, or any other known or later developed processor. The processor 150 operates pursuant to instructions in the memory 154.

The memory 154 may be a volatile memory or a non-volatile memory. The memory 154 may include one or more of a read only memory (ROM), random access memory (RAM), a flash memory, an electronic erasable program read only memory (EEPROM), or other type of memory. The memory 154 may include an optical, magnetic (hard drive) or any other form of data storage device. The memory 154 may be removable from the mobile device 108 (e.g., may be a secure digital (SD) memory card).

The input device 158 may be or include one or more buttons, a keypad, a keyboard, a mouse, a stylist pen, a rocker switch, a touch pad, a touch screen, a voice recognition circuit, a heat sensor, a capacitive sensor, a acoustic sensor, or other device or component for inputting data to the mobile device 108. The display 162 may be a liquid crystal display (LCD) panel, light emitting diode (LED) screen, thin film transistor screen, or another type of display. In the illustrated embodiment depicted by FIG. 2, the mobile device 108 has a touch screen, which may be capacitive, resistive, surface acoustic wave, or another type, such that the input device 158 and the display 162 are integrated.

As will be described in greater detail below, the end user 112 may, via or using the input device 158 and/or the display 162, provide (e.g., define, specify, determine) a user authentication for permitting data to be exchanged with the NFC device 104, perform an action with the mobile device 108 in an attempt to satisfy the previously provided authentication and thus permit the exchange of data with the NFC device 104, facilitate the actual exchange of data between the NFC device 104 and the mobile device 108, or combinations thereof. Any or all of the above acts may be performed with or using the software application 170.

The operating system 166 is installed on or in the memory 154 of the mobile device 108 or a separate memory. The operating system 166 may be Linux, Microsoft Windows, Android, iOS, Windows CE, MAC OS X, or any other operating system.

The application 170 is installed and executable on the operating system 166 of the mobile device 108. The application 170 allows the end user 112 to enhance the security of NFC, particularly data exchanged via or using NFC, between the NFC device 104 and the mobile device 108. To this end, the application 170 allows the end user 112 to provide (e.g., define, specify) a user verification or authentication (e.g., an authentication key) specific to the end user 112 for permitting NFC, and, more particularly, allowing data to be exchanged between the NFC device 104 and the mobile device 108.

The application or module 170 may be a mobile or smart phone application ("app"), a Web browser (e.g., Firefox, Internet Explorer), an email application, a messaging application, or other plug in or proprietary application built into or installed on the operating system 166. The application 170, or components thereof, may be automatically installed on or built into (e.g., come with) the operating system 166 of the mobile device 108 or may be downloaded or obtained (e.g., purchased) by the end user 112 and installed on the operating system 166 of the mobile device 108 after the mobile device 108 has been purchased or otherwise acquired. The application 170 may automatically execute on the mobile device 108 when the mobile device 108 is powering up, in response to a request from the end user 112, or in response to some other trigger or event. The application 170 may be written in a suitable computer programming language such as C, although other programming languages (e.g., C++, Java, etc.) are also suitable. In one embodiment, the application 170 (or individual components thereof, as described below) may be implemented as computer program logic or computer readable program code stored in the memory and/or storage of a computer, such as the computer 300 described below with respect to FIG. 5, and executable by one or more processors thereof to implement the disclosed functionality.

As shown in FIG. 2, the mobile device 108 further includes a positioning system 174. The positioning system 174 includes a global positioning system (GPS) or a cellular or similar position sensor for providing location data. The positioning system 174 may utilize GPS-type technology, a dead reckoning-type system, cellular location, or combinations of these or other systems. The positioning system 174 may include suitable sensing devices that measure the traveling distance, speed, direction, and so on, of the mobile device 108. The positioning system 174 may also include a receiver and correlation chip to obtain a GPS signal.

The mobile device 108 further includes one or more detectors or sensors located or positioned anywhere within, outside of, or a combination thereof, of the mobile device 108. The one or more detectors or sensors may be or include one or more optical sensors or detectors (e.g., a camera), one or more motion sensors or detectors (e.g., a tile sensor, gyroscope, or an accelerometer), one or more touch or tactile sensors (e.g., infrared, acoustic, or capacitive sensor), any other known or later developed sensors or detectors, or combinations thereof.

The one or more sensors or detectors may be configured to determine (e.g., detect, recognize, measure, record) an absolute orientation (e.g., perspective) of the mobile device 108 or relative orientation (e.g., perspective) of the mobile device 108, such as, for example, the orientation of the mobile device 108 relative to the NFC device 104. The one or more sensors or detectors may, for example, determine the heading or direction of the mobile device 108 (relative to the NFC device 104 or a true cardinal direction), the tilt or slope of the mobile device 108 (relative to a ground surface or a horizontal axis, such as one defined by the NFC device 104), the twist or slope of the mobile device 108 (relative to a vertical axis, such as one defined by the NFC device 104), the bearing of the mobile device 108 (relative to the NFC device 104 or some other device), or combinations thereof.

Additionally or alternatively, the one or more sensors or detectors may be configured to determine (e.g., detect, recognize, measure, record) translational and/or rotational movement of the mobile device 108. The translational and/or rotational movement is due to or caused by changing the orientation (e.g., the perspective) or position of the mobile device 108. In one embodiment, the determined translational and/or rotational movement may be, for example, due to or caused by changing the orientation of the mobile device 108 (relative to the ground surface, the NFC device 104, or one of the cardinal directions). The translational and/or rotational movement is different than or in addition to movement associated with a change in the geographic location of the mobile device 108 (i.e., movement other than movement of the mobile device 108 due to or caused by traveling along roads, a bike network, a transit network, other network or path, or combinations thereof, in a geographic region). The determined translational and/or rotational movement may, for example, be due to or caused by changing the heading or direction of the mobile device 108 (relative to the NFC device 104 or one of the true cardinal directions), changing the tilt and/or twist of the mobile device, changing the bearing of the mobile device 108, or changing the location with a variance other than changes typical for travel along a route. For example, the one or more sensors or detectors may determine that the mobile device 108 has been moved (e.g., translated, rotated) toward or away from the NFC device 104 in addition to translation while traveling, accelerating or braking (e.g., user wiggled the mobile device 108 back and forth).

Additionally or alternatively, the one or more sensors or detectors may be configured to determine (e.g., detect, recognize, measure, record) one or more objects (e.g., one or more environmental features or objects) and/or changes thereto. The one or more objects are exterior to the mobile device 108, so are other than keyed input to the mobile device 108. The one or more objects may or may not be associated with or related to the NFC device 104. For example, when the NFC device 104 is positioned on a security door, the one or more objects may include a designated portion of the door frame surrounding the security door. In some embodiments, the one or more objects may be adjacent to or near the NFC device 104. In other embodiments, the one or more objects are remotely located from the NFC device 104.

In the embodiment illustrated in FIG. 2, the one or more sensors of the mobile device 108 include an accelerometer 178, a gyroscope 182, and a camera 186. The accelerometer 178 and the gyroscope 182 are built or embedded into or within the interior of the mobile device 108. The camera 186 is located on or built into a top right-hand corner of a front surface or face 188 of the mobile device 108 (defined, at least in this embodiment, as the surface or face of the device 108 facing the end user 112). In other embodiments, the camera 186 may be positioned or located elsewhere on or in the mobile device 108. For example, the camera 186 may be located on or built into a rear surface (not shown) of the mobile device.

The accelerometer 178 is configured to determine (e.g., recognize, measure, or detect, record) rotational movement of the mobile device 108 by the end user 112 or other source. When the accelerometer 178 determines that the mobile device 108 has been rotated about its vertical axis 190 and/or horizontal axis 194, the accelerometer 178 determines (e.g., measures) the magnitude of the rotation of the device 108 about the vertical axis 190, the horizontal axis 194, and/or another axis. The accelerometer 178 may, for example, determine that the device 108 has been rotated at an angle of 30 degrees, 45 degrees, etc., about the vertical axis 190 of the mobile device 108. Alternatively, the accelerometer 178 measures that rotation has occurred and/or measures a direction with or without determination of a specific magnitude (e.g., binary decision of threshold magnitude) or measures magnitude without direction. The accelerometer 178 outputs or transmits, to the processor 150, data indicative of the measured or determined rotational information of the mobile device 108.

The gyroscope 182 is configured to determine (e.g., recognize, measure, detect, record) the orientation (e.g., perspective) of the mobile device 108. The gyroscope 182 may determine the orientation of the mobile device 108 at one point in time. When the end user 112 or other source changes the orientation of the mobile device 108, the gyroscope 182 may determine the change in orientation of the mobile device 108. The gyroscope 182 may, for example, determine that the mobile device 108 is oriented against true north. The gyroscope 182 may detect that the orientation has changed with or without determination of a specific magnitude of that change (e.g., binary decision of threshold magnitude). The gyroscope 182 outputs or transmits, to the processor 150, data indicative of the determined orientation, and/or change(s) thereof, of the mobile device 108.

The camera 186 includes, but is not limited to, a lens and circuitry for capturing images and/or videos of the one or more objects. Additional, fewer, or different components may be provided. For example, a flash or flash circuitry may be provided. The camera 186 may be configured to move in any number of directions. The camera 186 outputs or transmits, to the processor 150, data indicative of an image, series of images, or video content captured by the camera 186.

With reference again to FIG. 1, when the NFC device 104 and the mobile device 108 are touching or in close proximity to one another, NFC between the NFC device 104 and the mobile device 108 (through or using the NFC unit 116) may be established. In some embodiments, close proximity encompasses a distance of between 0 and 20 cm. In one embodiment, close proximity refers to a distance of less than 10 cm. In other embodiments, close proximity may encompass a distance of greater than 20 cm.

Once NFC has been established between the NFC device 104 and the mobile device 108, data or information, such as transactional or commercial information, sensitive information (e.g., credit card information, social security numbers), access or security information (e.g., access codes, keys), and/or personal data (e.g., images, videos, files, music) are typically exchanged or communicated, using or via NFC, between the NFC device 104 and the mobile device 108. As noted above, however, in the event that the mobile device 108 is lost or stolen, sensitive information and/or security information, and/or these exchanges of data, may be replicated or compromised (by, for example, an un-authorized user).

Accordingly, to enhance the security of these near-field communications, the end user 112 may, using or via the application 170, provide (e.g., define, create, specify) a user authentication or verification that is to be provided (e.g., produced, input) to permit the exchange of data between the NFC device 104 and the mobile device 108 when the devices are touching or in close proximity to one another. The user authentication is different than a typical text-based password (e.g., gobears) or personal identification number (e.g., 1234) and is generally related to (e.g., includes, involves, identifies) one or more environmental objects or features to be visually identified, a specific orientation (e.g., perspective) of the mobile device 108 to be produced, one or more changes to the orientation of the mobile device 108 to be produced, or combinations thereof, as specified by the end user 112. The user authentication may be provided by the end user 112 by or via entering text, selecting options (e.g., provided as part of a check-list), providing (e.g., uploading) an image, series of images, and/or video content, or combinations thereof, in or within the application 170. The image, series of images, or video may be obtained (e.g., captured) by the end user 112 using the camera 186 of the mobile device 108 or via another camera (e.g., a camera of another mobile device) and may be stored in any number of different formats (e.g., JPEG, Bitmap, Tiff, SVG, AVI, MOV, MPG, etc.) When one or more images are provided, the one or more images may be pixelated and/or other image processing techniques may be applied to discern the one or more objects, the specific orientation, the one or more orientation changes, or combinations thereof, desired by the end user 112. The user authentication is specific to the mobile device 108. In other words, the user authentication is personalized to the mobile device 108 and the end user 112 associated therewith. In turn, an extra layer of security may be added, giving the end user 112 additional peace of mind regarding the communication(s) of potentially sensitive data.

In some embodiments, the user authentication is related to one or more environmental objects or features, specified by the end user 112, that are to be visually identified to permit the exchange of data between the NFC device 104 and the mobile device 108. The one or more environmental objects or features are to be identified in an image or video, such as an image or video captured by the camera 186 of the mobile device 108. The one or more environmental objects or features are external or environmental to the mobile device 108 and are different than characteristics (e.g., biometrics, clothing) of or about the end user 112. The one or more environmental objects or features should generally be reliable, consistent, and not temporary (though they need not be permanent). The one or more environmental objects or features may be associated with the NFC device 104. The one or more environmental objects or features may be intrinsically relevant to the NFC device 104 and/or located proximate to the NFC device 104. For example, when the NFC device 104 is used for controlling access to the residence of the end user 112 and is located on or proximate to a door of that residence, the end user 112 may specify that one or more specific bricks near the door, a portion of the door frame surrounding the door, or a welcome mat placed in front of the door, or combinations thereof, are to be visually identified. In other embodiments, the one or more environmental objects or features may not be relevant to the NFC device 104 and/or may not be located proximate to the NFC device 104. In one embodiment, the one or more environmental objects or features may only be relevant to the end user 112. For example, when the NFC device 104 is used for controlling access to the residence of the end user 112 and is located on or proximate to a door of that residence, the end user 112 may specify that a flag hanging from the residence of the user, which has no intrinsic relevance to the NFC device 104 but is particularly important to the user, be visually identified.

In one embodiment, the user 112 may specify two or more environmental objects or features to be visually identified. The two or more environmental objects may need to be identified in a certain way (e.g., in an order), which may be specified by the end user 112 and/or the application 170. In the example in which the NFC device 104 is used for controlling access to the residence of the end user 112 and is located on or proximate to a door of that residence, the user 112 may specify, for example, that a brick near the door is to be identified first, followed by a welcome mat placed in the front of the door. The two or more environmental objects may need to be simultaneously identified (e.g., in the same image) or identified within a pre-determined period of time (e.g., within 10 seconds).

Alternatively or additionally, the user authentication is related to (e.g., involves, includes, is directed to) a specific orientation or perspective (i.e., a single perspective) of the mobile device 108 to be produced (e.g., reached, achieved, caused to happen) to permit the exchange of data between the NFC device 104 and the mobile device 108. The orientation or perspective is specified by the end user 112, such that the user authentication is related to a personalized orientation or perspective. The specific orientation may be produced by the end user 112 or by another user (e.g., a user given permission by the end user 112) of the mobile device 108.

The orientation may be specified relative or with respect to one or more of the cardinal directions (e.g., N), the ground surface, the NFC device 104, some other device or object, or combinations thereof. In specifying the orientation of the mobile device 108, the end user 112 may specify the desired heading or direction of the mobile device 108 (e.g., relative to the NFC device 104 or a cardinal direction), the tilt of the mobile device 108 (e.g., relative to horizontal or some other defined horizontal axis), the twist of the mobile device 108 (e.g., relative to vertical or some other defined vertical axis), the bearing of the mobile device 108 (e.g., relative to the NFC device 104 or some other device), or combinations thereof, to be produced. In one embodiment, the end user 112 specifies the desired heading, tilt, and twist of the mobile device 108. For example, the end user 112 may specify that the mobile device 108 be oriented West of the NFC device 104, with no tilt (i.e., no angle relative to the horizontal), and at a 30 degree angle relative to the vertical. Any combination of heading, tilt, and twist may be specified by the end user 112.

Alternatively or additionally, the user authentication is related to (e.g., involves, includes, is directed to) one or more changes to the orientation or perspective of the mobile device 108 to be produced (e.g., reached, achieved, caused to happen) to permit the exchange of data between the NFC device 104 and the mobile device 108. Stated another way, the user authentication may be related to one or more changes between two different orientations or perspectives, the first of the two orientations being an initial orientation, such as a default orientation or a specified initial orientation, and the second of the two orientations being a final or desired orientation. Any combination of sequence of changes may be used, such as a translation by an amount, followed by a tilt, followed by a circular motion. The one or more changes are specified by the end user 112 and may be produced by the end user 112 or by another user (e.g., a user given permission by the end user 112) of the mobile device 108.

The one or more changes may be specified relative or with respect to one or more of the cardinal directions (e.g., N), the ground surface, the NFC device 104, some other device or object, or combinations thereof. In specifying the one or more changes to the orientation of the mobile device 108, the end user 112 may specify an initial or default orientation with an initial heading, tilt, twist, bearing, or combinations thereof, and that the heading of the mobile device 108, the tilt of the mobile device 108, the twist of the mobile device 108, the bearing of the mobile device 108, or combinations thereof, is/are to be changed in a specific way. In one embodiment, the end user 112 specifies a change to the tilt and twist of the mobile device 108. For example, the end user 112 may specify that the mobile device 108 be tilted 90 degrees and twisted 90 degrees in a clockwise direction from the initial orientation (e.g., oriented with a top of the mobile device 108 facing towards North, with no tilt, and with no twist).

Moreover, as a way of incorporating additional security, the user authentication may include a velocity or speed of one or more of the changes and/or one or more temporal requirements for one or more of the changes, as specified by the end user 112. The velocity may be the velocity in which the heading, tilt, twist, or bearing of the mobile device 108 is changed. When, for example, the one or more changes include a change to the tilt of the mobile device 108, the velocity is the velocity of the change to the tilt of the mobile device 108. Put another way, in this example, the velocity is the velocity of change or rotation between the initial tilt of the mobile device 108 (before the change) and the final or desired tilt of the mobile device 108 (after the change). The one or more temporal requirements may be or include a specified time for completing one or more of the changes (e.g., 30 seconds), a specified time between one or more of the changes (e.g., after one of the changes is produced, the mobile device 108 is to be held in that corresponding orientation for 5 seconds before any further changes are produced), or a specified holding time before and/or after the one or more changes are produced (e.g., the mobile device 108 is to be held in its initial orientation for 5 seconds before the one or more changes are to be produced).

In some embodiments, the user authentication may include combinations of one or more environmental objects or features to be visually identified, a specific orientation (e.g., perspective) of the mobile device 108 to be produced, and one or more changes to the orientation of the mobile device 108 to be produced. In one embodiment, the user authentication includes a combination of one or more environmental objects or features to be visually identified and a specific orientation (e.g., perspective) of the mobile device 108 to be produced. The user authentication may thus include one or more environmental objects or features that are to be visually identified at a specific orientation. For example, the user authentication may include a brick near the door of the end user 112 to be visually identified at a specific angle or orientation. Other combinations of objects or features, specific orientations, and/or changes thereto, may be utilized as well.

As noted above, the end user 112 may utilize the software application 170 to provide the user authentication or verification. To this end, the software application 170 may include features or components to help the end user 112 provide the user authentication. The software application 170 may, in some embodiments, provide the user 112 with a compass and/or a digital level, which may, for example, be used in connection with the camera 186 of the mobile device 108 to help the user 112 provide the user authentication. For example, the user 112 may utilize the compass and/or the digital level to define a heading, tilt, or twist to be produced. The software application 170 may, in some embodiments, provide the end user 112 with authentication advice or guidance, such as tips or common or exemplary perspective strategies. For example, the software application 170 may notify the end user 112 that the partially or completely provided user authentication is not sufficiently secure (i.e., not sufficiently complex), is sufficiently secure, or is sufficiently secure but may be overly complex (and, thus, difficult to re-produce). As another example, the software application 170 may provide the end user 112 with a heading, tilt, and twist that are commonly used to form the basis of a secure user authentication. Once the end user 112 provides the user authentication, the software application 170 may prompt the user 112 to validate the user authentication by satisfactorily providing it once again. In the event that the user 112 is unable to validate the user authentication, the software application 170 may prompt the user 112 to re-provide the user authentication or provide a different user authentication.

The user authentication may be specific to the NFC device 104 (i.e., the end user 112 provides a different user authentication for different NFC devices 104), one or more different NFC devices 104, or may be universal to each of the different NFC devices 104 (i.e., the same user authentication is provided for each NFC device 104). The user authentication may, in some embodiments, be utilized only in specific circumstances, such as for a specific purpose and/or in a specific location. For example, the user authentication may only be utilized when the NFC device 104 is being used for a specific purpose, such as to conduct commerce, control access to a vehicle, residence, sports stadium, or a public transportation system, or exchange photos, videos, or music. As another example, the user authentication may only be utilized when the NFC device 104 is being used in a specific location(s), such as in specific neighborhoods, in different place categories (e.g., in restaurants), or in connection with the user's vehicle or residence (e.g., on or adjacent a vehicle associated with the end user 112). The user authentication may also not be used in certain circumstances, such as, for example, in certain locations (e.g., not used for access to home but used for access to work). The user authentication may be changed at any time, such as at pre-determined frequencies (e.g., every day, once a week, once a month), such that the user authentication is dynamic and, thus, more secure.

After the end user 112 provides the user authentication, the user authentication may be stored in the memory 154 of the mobile device 108 and/or in another memory. In some embodiments, the provided user authentication may also or alternatively be transmitted to the NFC device 104 and stored therein. The stored information may be encrypted.

Subsequent to the provision of the user authentication using the application 170, as described above, a user (e.g., the user 112 or another user) of the mobile device 108 may wish to exchange data between the NFC device 104 and the mobile device 108. For example, a user of the mobile device may wish to conduct commerce (e.g., a transaction), obtain access to a secure location, such as a residence, a vehicle, or a public transportation system, or exchange photos, videos, or music. To this end, the user may move the mobile device 108 so that it is touching or in close proximity to the NFC device 104 and near-field communications between the two devices are possible. A communications link may be established or not, but because of the additional security measures offered by the present embodiments, the desired data exchange (e.g., of sensitive information) between the NFC device 104 and the mobile device 108 may not occur until or unless the previously provided user authentication is substantially provided or satisfied. In other words, data may only be exchanged between the NFC device 104 and the mobile device 108 when a user (e.g., the user 112 or another user) of the mobile device 108 performs one or more actions with the mobile device 108 that substantially satisfy or match the provided user authentication.

When the user wishes to exchange data between the NFC device 104 and the mobile device 108 and the devices are at least in close proximity to one another, the application 170 may prompt the user, via or using, for example, the display 162, to perform one or more un-specified actions or tasks (e.g., obtain an image of one or more un-specified objects, change the orientation of the mobile device 108 in an un-specified way, etc.) in an attempt to satisfy the pre-defined user authentication and, in turn, permit the exchange of data. The application 170 may provide (e.g., allot) the user a pre-determined or specified amount of time (e.g., 1 minute) and/or opportunities (e.g., 5 chances) to perform the one or more actions. The application 170 may, alternatively, provide or allot the user an unlimited amount of time and/or opportunities to perform the one or more un-specified actions or tasks.

The application 170 is then configured to determine (e.g., detect, recognize, or measure) one or more actions performed by the user with the mobile device 108 in response to or based on the prompt. The one or more actions may include obtaining an image, a series of images, or video content of or depicting one or more environmental objects, orienting the mobile device 108 in a specific way, changing the orientation of the mobile device 108 in a specific way (e.g., rotating the mobile device 108), one or more other actions, or combinations thereof, with or using the mobile device 108. For example, the one or more actions may include capturing, using the camera 186, an image of one or more objects adjacent to the NFC device 104, such as, for example, a brick, a plant, a welcome mat, etc. As another example, the one or more actions may include positioning the mobile device 108 at an initial orientation and moving (e.g., rotating) the mobile device 108 in a specific way (e.g., at a specific tilt, twist, or velocity).

Since the one or more actions are generally performed by manipulating one or more of the sensors or detectors of the mobile device 108, the application 170 determines the one or more actions using or based on the positioning system 174 and/or the one or more sensors or detectors provided with or in the mobile device 108, such as the accelerometer 178, the gyroscope 182, and the camera 186. More specifically, the application 170 determines the one or more actions using or based on data indicative of the one or more actions output by the one or more sensors or detectors and transmitted to the processor 150. In the embodiments in which the mobile device 108 includes the accelerometer 178, the gyroscope 182, and the camera 186, the application 170 may determine the one or more actions using or based on data indicative of position and/or speed information determined and output by the positioning system 174, data indicative of rotational information determined and output by the accelerometer 178, data indicative of the orientation, and/or changes thereof, determined and output by the gyroscope 182, one or more images and/or video content obtained (e.g., captured) by the camera 186, or combinations thereof. In some embodiments, the application 170 may determine the one or more actions using or based on data output by and obtained from the NFC device 104. The data output by and obtained from the NFC device 104 may, for example, indicate the translational and/or rotational movement of the mobile device 108 relative to the NFC device 104. In other embodiments, the mobile device 108 may determine the one or more actions using or based on data indicative of information determined and output by other sensors or detectors.

The application 170 may, in turn, determine whether the one or more actions performed by the user with the mobile device 108 satisfy the provided and stored user authentication. The application 170 may perform this determination by analyzing the data indicative of the one or more actions and the data indicative of the user authentication. The application 170 may, for example, compare the data indicative of the one or more actions with data indicative of the user authentication. In some embodiments, the application 170 may determine that the one or more actions performed by the user with the mobile device 108 satisfy the user authentication when the one or more actions substantially equal or match the provided and stored user authentication. Substantially satisfying the user authentication may be determined using a minimum requirement or threshold, such as, for example, a number (e.g., 1) of standard deviations from or within the provided and stored user authentication and/or a percentage of the one or more performed actions that matches the provided and stored user authentication. For example, the application 170 may determine whether at least 95% an image of one or more environmental objects captured by the user equals or matches an image provided and stored as the user authentication. A measure of correlation may be used, such as a minimum sum of absolute differences. As another example, the application 170 may determine whether the rotational velocity of the movement of the mobile device 108 is within one standard deviation of the rotational velocity of the movement of the mobile device 108 specified in the user authentication. In other embodiments, the application 170 may determine that the one or more actions performed by the user with the mobile device 108 satisfy the user authentication when the one or more actions exactly equal, match, or satisfy the provided and stored user authentication.

Satisfaction of the user authentication is indicative of the user being an authorized user (e.g., the end user 112 that provided the user authentication in the first place or another user granted permission to use the mobile device 108 by the end user 112) rather than an un-authorized user (e.g., a person that stole or found the mobile device 108). Accordingly, when the application 170 determines that the one or more actions performed by the user with the mobile device 108 satisfy the user authentication, the application 170 determines (e.g., assumes, verifies) that the user is an authorized user. In turn, the user or the mobile device 108 is permitted to exchange or communicate data with the NFC device 104. This may, for example, allow the user to conduct commerce, access a secure location (e.g., a residence, a vehicle), or share personal data (e.g., photos, videos, or music). The data exchange may automatically occur or may occur after the user satisfies the user authentication and subsequently requests the data exchange.

When, however, the application 170 determines that the one or more actions performed by the user do not satisfy the user authentication (i.e., the one or more actions do not exactly or substantially equal or satisfy the user authentication), the application 170 may determine or conclude that the user is not an authorized user. The application 170 may thus refuse to permit the exchange or communication of data between the NFC device 104 and the mobile device 108.

In some situations, the application 170 may be correct that the user is indeed an un-authorized user. In other situations, though, the user might actually be an authorized user who did not properly perform the one or more actions (e.g., the angle of the image was slightly askew). Accordingly, to prevent the application 170 from undesirably preventing an authorized user from exchanging data, the application 170 may provide the user with one or more additional opportunities to satisfy the user authentication. The application 170 may, in the same manner described above, determine whether the user satisfies the user authentication when given these one or more additional opportunities.

In other embodiments, one or more of the above-noted tasks (e.g., providing the user authentication, determining the one or more actions performed by the user with the mobile device 108, determining whether the one or more actions satisfy the user authentication) may be performed by or shared with different components of the system 100 (e.g., the NFC device 104). For example, the NFC device 104 may determine the one or more actions performed by the user with the mobile device 108 instead of or in conjunction with the application 170 of the mobile device 108. Data associated with determining authentication may be obtained (e.g., measured) by the NFC device 104 or by transmission from the mobile device 108 to the NFC device 104. Similarly, the access to or permission to exchange data may be controlled by the NFC device 104 rather than the mobile device 108.

Figure 3:
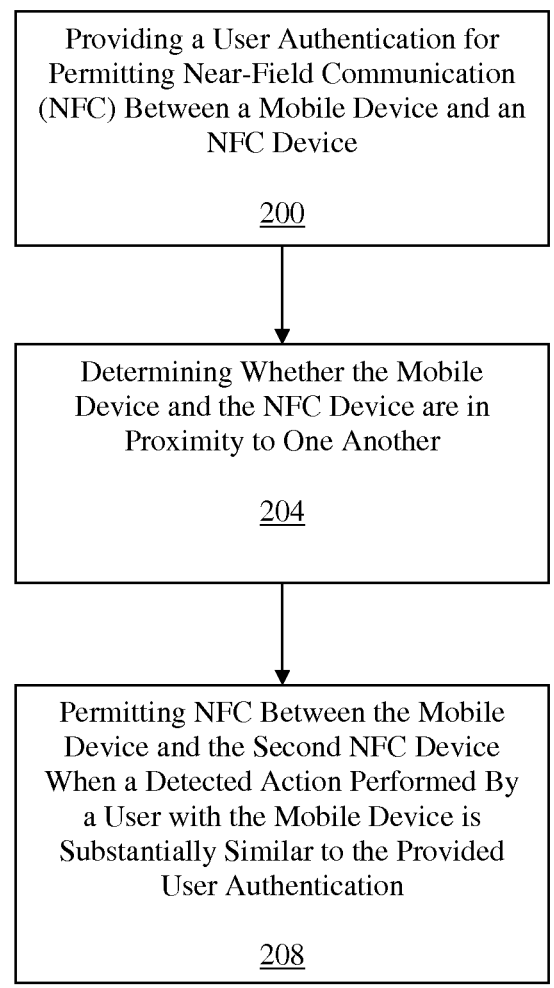
FIG. 3 depicts a flow chart showing one embodiment of a method for enhancing security of NFC between a mobile device and an NFC device.

FIG. 3 shows a flow chart depicting a method or operation for enhancing security of a near-field communication (NFC) between a mobile device (e.g., the mobile device 108) enabled as a first NFC device and a second NFC device (e.g., the NFC device 104). The method or operation may be implemented using the system 100 described above. In other embodiments, a different system may be used. The method is implemented in the order shown, but may be implemented in or according to any number of different orders. Additional, different, or fewer acts may be provided. For example, two or more user authentications may be provided (e.g., for different NFC devices). As another example, the determining and permitting acts may be repeated any number of times.

The operation or method includes providing a user authentication via a mobile device (e.g., the mobile device 108) enabled as a first near-field communication (NFC) device (act 200). The user authentication is specified by an end user (e.g., the end user 112) of the mobile device for permitting NFC with a second NFC device (e.g., the NFC device 104). The user authentication is related to an environmental object or a perspective of the mobile device specified by the end user. The environmental object may, in some embodiments, be adjacent the second NFC device. The perspective of the mobile device may, in some embodiments, include a heading, tilt, and twist of the mobile device. The perspective of the mobile device may, in other embodiments, include two or more of a heading, tilt, twist, and bearing of the mobile device.

The operation or method includes determining whether the mobile device and the second NFC device are in proximity to one another (act 204), and permitting NFC between the mobile device and the second NFC device when a detected action performed by a user with the mobile device is substantially similar to the provided user authentication (act 208). Permitting the NFC between the mobile device and the second NFC device may include permitting an exchange of transactional data, security access information, or personal data (e.g., contacts, photos, videos, and files) between the mobile device and the second NFC device.

The operation or method may further include providing a second user authentication, different from the user authentication, specified by the end user of the mobile device for permitting NFC between the mobile device and a third NFC device that is different than the second NFC device. Any number of different or additional user authentications may be provided for permitting NFC between the mobile device and the second, third, and/or other NFC device(s). The operation or method may alternatively or additionally include changing the user authentication at a pre-determined frequency of time (e.g., every day, once a week, etc.)

Figure 4:
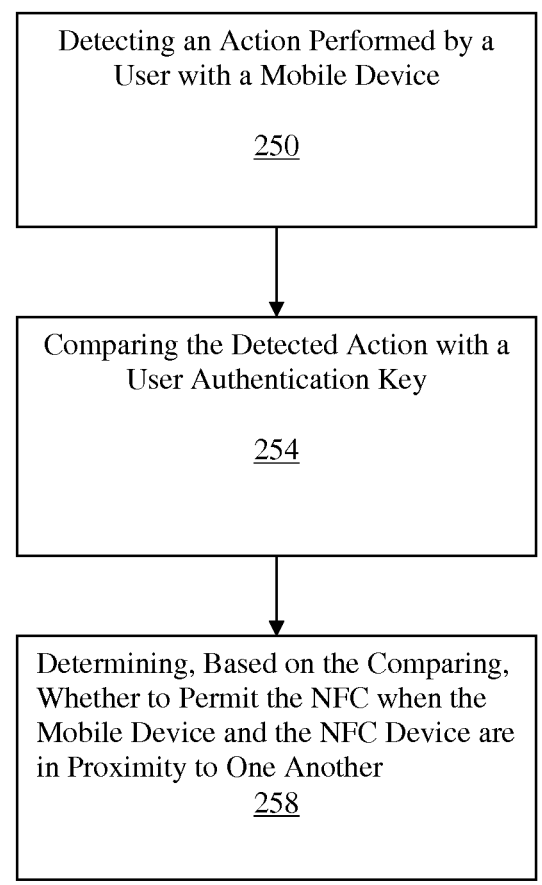
FIG. 4 depicts a flow chart showing another embodiment of a method for enhancing security of NFC between a mobile device and an NFC device.

FIG. 4 shows a flow chart depicting a method or operation for enhancing the security of near-field communication (NFC) between a mobile device (e.g., the mobile device 108) enabled as a first NFC device and a second NFC device (e.g., the NFC device 104). The method or operation may be implemented using the system 100 described above. In other embodiments, a different system may be used. The method is implemented in the order shown, but may be implemented in or according to any number of different orders. Additional, different, or fewer acts may be provided. For example, two or more actions may be detected. Accordingly, the comparing and determining acts may be repeated in connection with each of these detected actions.

The method or operation includes detecting an action performed by a user with the mobile device (act 250). Detecting the action performed by the user may include detecting the action using one or more input sensors of the mobile device, such as, for example, a positioning system (e.g., the positioning system 174), an accelerometer (e.g., the accelerometer 178), a gyroscope (e.g., the gyroscope 182), a camera (e.g., the camera 186), or combinations thereof, of the mobile device. Detecting the action performed by the user may, in some embodiments, include detecting a movement (e.g., a rotational movement) of the mobile device by the user. In one embodiment, detecting the action performed by the user includes detecting an image captured by the mobile device.

The method or operation includes comparing the action performed by the user with the mobile device with a user authentication key (act 254). The user authentication key is specified by an end user of the mobile device for permitting NFC between the mobile device and the second NFC device. The user authentication key relates to an environmental object or a perspective of the mobile device specified by an end user. In the embodiment in which detecting the action performed by the user includes detecting the image captured by the mobile device, comparing the action performed by the user with the mobile device with the user authentication key may include comparing the image captured by the mobile device with the user authentication key, the user authentication key being related to an image of an environmental object.

The method or operation further includes determining, based on the comparing, whether to permit the NFC when the mobile device and the NFC device are in proximity to one another (act 258). The determining may include determining to permit the NFC when the action performed by the user substantially satisfies (e.g., is substantially similar to) the user authentication key. Conversely, the determining may include determining not to permit the NFC when the action performed by the user does not substantially satisfy (e.g., is not substantially similar to) the user authentication key.

Figure 5:
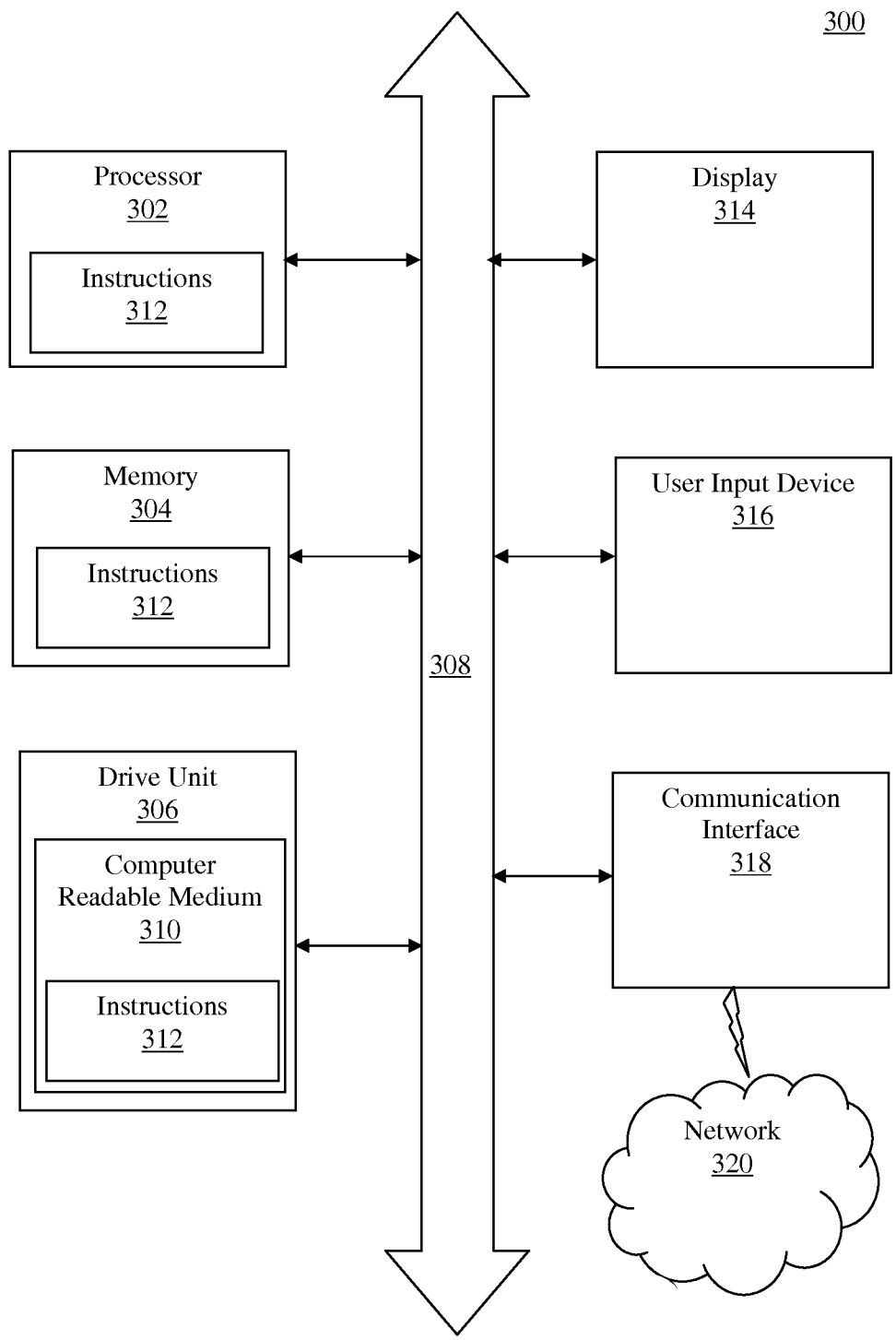
FIG. 5 depicts an exemplary computer system for use with the system of FIG. 1.

As noted above, the application 170, any other application or module, or individual components of any application may be implemented as computer program logic or computer readable program code stored in the memory and/or storage of a computer, such as the computer 300. FIG. 5 illustrates an embodiment of the computer system 300. The computer system 300 can include a set of instructions that can be executed to cause the computer system 300 to perform any one or more of the methods or computer based functions disclosed herein. The computer system 300 may operate as a standalone device or may be connected, e.g., using a network, to other computer systems or peripheral devices. Any of the components discussed above may be a computer system 300 or a component in the computer system 300.

In a networked deployment, the computer system 300 may operate in the capacity of a server or as a client user computer in a client-server user network environment, or as a peer computer system in a peer-to-peer (or distributed) network environment. The computer system 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 300 is illustrated, the term "system" shall also be taken to include any collection of systems or sub-systems that individually or jointly execute a set, or multiple sets, of instructions to perform one or more computer functions.

As illustrated in FIG. 5, the computer system 300 may include a processor 302, e.g., a central processing unit (CPU), a graphics processing unit (GPU), or both. The processor 302 may be a component in a variety of systems. For example, the processor 302 may be part of a standard personal computer or a workstation. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The computer system 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 304 includes a cache or random access memory for the processor 302. In alternative embodiments, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the programmed processor 302 executing the instructions stored in the memory 304. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multi-tasking, parallel processing and the like.

As shown, the computer system 300 may further include a display unit 314, such as a liquid crystal display (LCD), an organic light emitting diode (OLED), a flat panel display, a solid state display, a cathode ray tube (CRT), a projector, a printer or other now known or later developed display device for outputting determined information. The display 314 may act as an interface for the user to see the functioning of the processor 302, or specifically as an interface with the software stored in the memory 304 or in the drive unit 306.

Additionally, the computer system 300 may include an input device 316 configured to allow a user to interact with any of the components of system 300. The input device 316 may be a number pad, a keyboard, or a cursor control device, such as a mouse, or a joystick, touch screen display, remote control or any other device operative to interact with the system 300.

In a particular embodiment, as depicted in FIG. 5, the computer system 300 may also include a disk or optical drive unit 306. The disk drive unit 306 may include a computer-readable medium 310 in which one or more sets of instructions 312, e.g. software, can be embedded. Further, the instructions 312 may embody one or more of the methods or logic as described herein. In a particular embodiment, the instructions 312 may reside completely, or at least partially, within the memory 304 and/or within the processor 302 during execution by the computer system 300. The memory 304 and the processor 302 also may include computer-readable media as discussed above.

The present disclosure contemplates a computer-readable medium that includes instructions 312 or receives and executes instructions 312 responsive to a propagated signal, so that a device connected to a network 320 can communicate voice, video, audio, images or any other data over the network 320. Further, the instructions 312 may be transmitted or received over the network 320 via a communication port 318. The communication port 318 may be a part of the processor 302 or may be a separate component. The communication port 318 may be created in software or may be a physical connection in hardware. The communication port 318 is configured to connect with a network 320, external media, the display 314, or any other components in system 300, or combinations thereof. The connection with the network 320 may be a physical connection, such as a wired Ethernet connection or may be established wirelessly as discussed below. Likewise, the additional connections with other components of the system 300 may be physical connections or may be established wirelessly.

The network 320 may include wired networks, wireless networks, or combinations thereof. The wireless network may be a cellular telephone network, an 802.11, 802.16, 802.20, or WiMax network. Further, the network 320 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
providing, via a mobile device enabled as a first near-field communication (NFC) device, a user authentication for permitting NFC with a second NFC device, the user authentication related to an environmental object or a perspective of the mobile device specified by an end user of the mobile device;
determining whether the mobile device and the second NFC device are in proximity to one another; and
permitting NFC between the mobile device and the second NFC device when a detected action performed by a user with the mobile device is substantially similar to the provided user authentication and the mobile device and the second NFC device are in proximity to one another.

2. The method of claim 1, wherein providing the user authentication comprises providing the user authentication, the user authentication being a perspective of the mobile device specified by the end user.

3. The method of claim 2, wherein providing the user authentication comprises providing the user authentication, the user authentication being a perspective of the mobile device relative to the second NFC device.

4. The method of claim 1, wherein providing the user authentication comprises providing the user authentication, the user authentication being a perspective of the mobile device specified by the end user, the perspective of the mobile device including a heading, tilt, and twist of the mobile device.

5. The method of claim 1, wherein providing the user authentication comprises providing the user authentication, the user authentication being a perspective of the mobile device specified by the end user, the perspective of the mobile device including two or more of a heading, tilt, twist, and bearing of the mobile device.

6. The method of claim 1, wherein permitting NFC between the mobile device and the second NFC device comprises permitting an exchange of transactional data, security access information, or contacts, photos, videos, and files between the mobile device and the second NFC device.

7. The method of claim 1, further comprising providing, via the mobile device, a second user authentication, different from the user authentication, specified by the end user of the mobile device for permitting NFC between the mobile device and a third NFC device, the third NFC device being different than the second NFC device.

8. The method of claim 1, further comprising changing the user authentication at a pre-determined frequency of time.

9. The method of claim 1, wherein providing the user authentication comprises providing the user authentication, the user authentication being the environmental object specified by the end user, the environmental object being adjacent the second NFC device.

10. A method comprising:
    detecting an action performed by a user with a mobile device;
    comparing, via a processor, the action performed by the user with the mobile device with a user authentication key, the user authentication key specified by an end user of the mobile device for permitting near-field communication (NFC) between the mobile device and a NFC device, the user authentication key related to an environmental object or a perspective of the mobile device specified by an end user; and
    determining, based on the comparing, whether to permit the NFC when the mobile device and the NFC device are in proximity to one another.

11. The method of claim 10, wherein detecting the action performed by the user comprises detecting the action performed by the user using one or more input sensors of the mobile device.

12. The method of claim 11, wherein detecting the action performed by the user using one or more input sensors of the mobile device comprises detecting the action performed by the user using a positioning system, an accelerometer, a gyroscope, a camera, or combinations thereof, of the mobile device.

13. The method of claim 10, wherein detecting the action performed by the user comprises detecting a movement of the mobile device by the user.

14. The method of claim 10, wherein determining comprises determining to permit the NFC when the action performed by the user substantially satisfies the user authentication key.

15. The method of claim 10, wherein detecting the action performed by the user comprises detecting an image captured by the mobile device, and wherein comparing the action performed by the user with the mobile device with the user authentication key comprises comparing the image captured by the mobile device with the user authentication key, the user authentication key being related to an image of an environmental object.

16. A system comprising:
    a mobile device operable as a first near-field communications (NFC) device; and
    a mobile application executing on the mobile device and configured to store a user defined authentication key for permitting NFC communication with a second NFC device, the user authentication key relating to an environmental object or an orientation of the mobile device specified by the end user,
    wherein the mobile application is configured to determine when the mobile device and the second NFC device are in proximity to one another, detect an action of the mobile device, and permit NFC communication between the mobile device and the second NFC device when the mobile device and the second NFC device are in proximity to one another and the detected action is substantially similar to the defined user authentication key.

17. The system of claim 16, wherein the second NFC device comprises an NFC reader used to control access to a vehicle or residence.

18. The system of claim 16, wherein the user authentication key comprises the orientation of the mobile device, the orientation of the mobile device including a heading, a tilt, and a twist of the mobile device specified by the end user.

19. The system of claim 16, wherein the user authentication key comprises an image of the environmental object, the environmental object being adjacent the second NFC device.

20. The system of claim 16, wherein the user authentication key comprises a change in the orientation of the mobile device.

* * * * *